Jan. 16, 1934.  M. ALEX  1,943,279
COMBINATION REFRIGERATOR AND BEVERAGE DISPENSER
Filed May 31, 1933
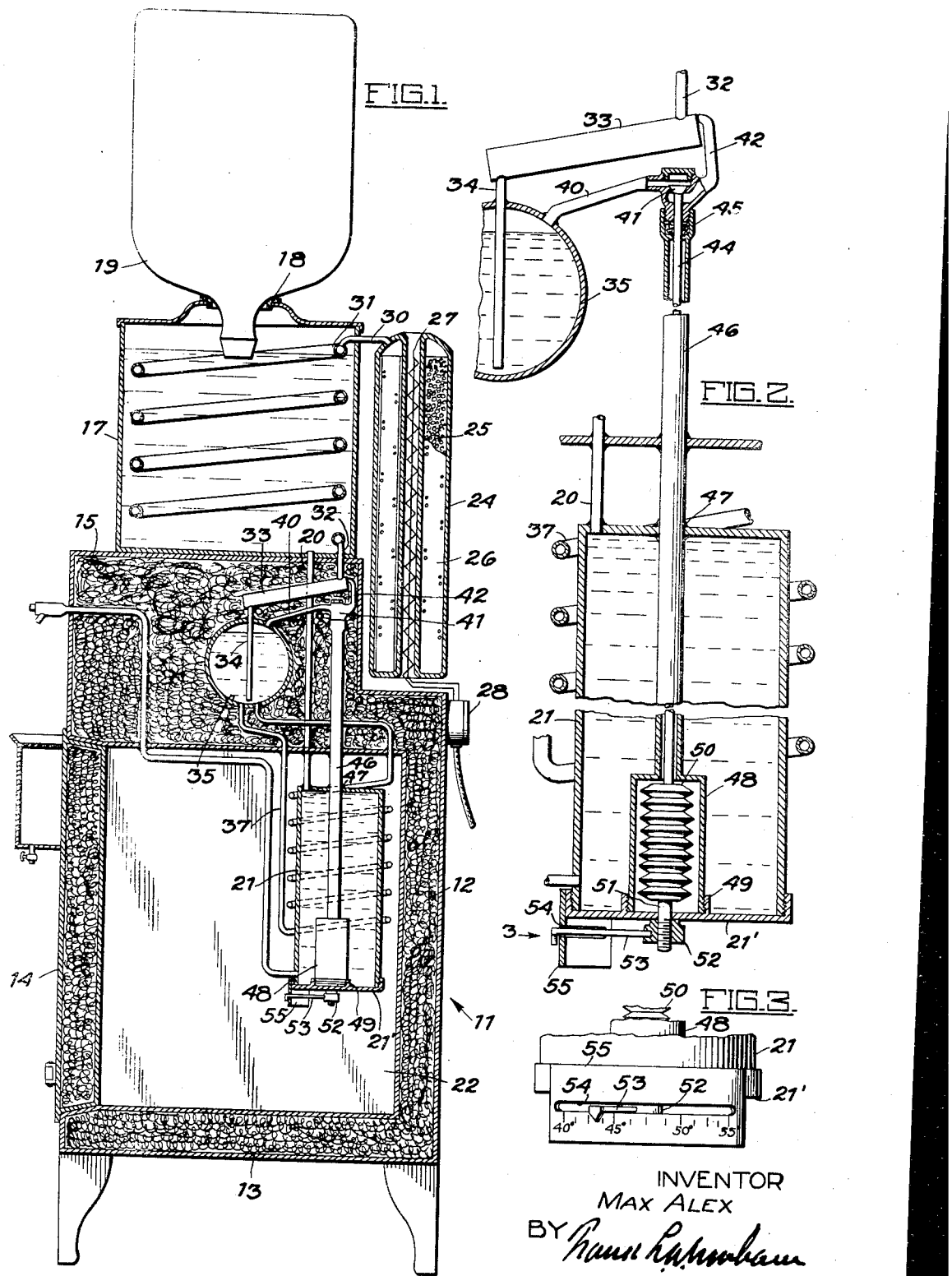
INVENTOR
MAX ALEX
BY
ATTORNEY Patented Jan. 16, 1934

1,943,279

UNITED STATES PATENT OFFICE 1,943,279

COMBINATION REFRIGERATOR AND BEVERAGE DISPENSER

Max Alex, Alhambra, Calif.

Application May 31, 1933. Serial No. 673,592

10 Claims. (Cl. 62—141)

This invention has to do in a general way with the art of refrigeration, and is more particularly related to improvements in apparatus of the general type shown and described in my copending application, Serial No. 645,528, filed December 3, 1932, which is particularly adapted for use in cooling beverages such as drinking water and the like.

The general construction of apparatus of the type referred to, comprises, what I have termed, a liquid-receiving reservoir adapted to receive a liquid, such as drinking water, from a suitable source of supply, such reservoir connecting through a conduit with, what I have termed, a liquid-cooling or liquid-storage reservoir. These two reservoirs are associated with a refrigerating system which consists, in a general way, of a generator absorber containing a suitable dry absorbent such as calcium chloride and a fluid refrigerant such as dry ammonia $NH_3$. The generator absorber contains, or is associated with, means for periodically heating same to expel the refrigerant, and is provided with a connection which leads to a condensing conduit arranged in heat-absorbing relation with the liquid in the receiving reservoir. This condenser conduit has an outlet connection which leads to a condensate container, such container in turn having a part which is arranged in heat-absorbing relation with the liquid-cooling and storage reservoir.

In operation, the generator absorber, is first heated to expel the fluid refrigerant, such refrigerant flowing in gas or vapor form into the condensate conduit where the latent heat of vaporization is absorbed by the liquid in the liquid-receiving reservoir, thereby condensing the refrigerant, such condensed refrigerant flowing into the condensate container.

Means are provided for controlling this generating period so that it occupies only a brief interval during the day and so that it preferably occurs at some time during the night or during the early morning hours when drinking water is not being withdrawn. At the end of the generating period, the absorbent in the generator absorber starts to cool. Meanwhile, the heat absorbed by the liquid in the receiving reservoir is being dissipated to the atmosphere, and, as the cooling of the absorbent proceeds, the pressure in the system decreases and the condensed refrigerant in the condensate container starts to evaporate, thereby absorbing heat from the liquid in the liquid-cooling and storage reservoir. The vapors, as they rise through the heat exchanger-condenser conduit to the generator absorber, also absorb heat from the liquid in the receiving reservoir.

Although the generating step, as pointed out above, occupies only a short period during the day, and preferably occurs at a time when the device is not in use. This period is attended by a definite increase in temperature which will manifest itself in the drinking water unless precautions are taken to maintain a reserve supply of cooled water or to arrange the liquid-storage reservoir in low temperature atmosphere, the volume of which is great enough to absorb the heat which would otherwise be transmitted to the stored liquid. In the device of my former application, referred to above, I provide an auxiliary storage chamber which is out of direct contact with the condensate container.

It becomes a primary object of this invention to provide a device of the class described wherein the liquid-storage chamber is maintained in a refrigerated atmosphere of sufficient capacity to absorb substantially all of the heat which is carried into the condensate container during the generation step without materially increasing the temperature of the atmosphere or the liquid in the storage reservoir. This object is accomplished, in the present form of my invention, by mounting the liquid-storage reservoir in an insulated box or compartment and providing the condensate container with a circulation conduit or tube that extends into such compartment and is preferably arranged in a coil surrounding the liquid-storage reservoir. This construction not only effectively accomplishes the object pointed out above, but by providing the compartment with a door I obtain an efficient refrigerator which may be used to store food stuffs, beverages, and the like. My invention may, therefore, be broadly considered as a combination refrigerator and beverage cooler and dispenser.

It is a recognized fact among health experts that drinking water if consumed at a temperature below substantially 45° F. has a detrimental effect upon the system. In this connection, it becomes another object of my invention to provide a device of the class described with means for controlling the temperature so that it will not at any time drop below a certain predetermined limit desired by the user.

For the purpose of effecting this temperature control, I propose to deliver the condensed refrigerant, coming from the condenser coil, into the condensate container at a point below the normal liquid level in the container. The vaporized refrigerant, as it leaves the condensate container, is drawn off through a conduit at the top of the condensate container, such conduit being provided with a valve which is actuated by a thermostat located either in the liquid storage reservoir or in the compartment wherein the liquid-storage reservoir is mounted. This arrangement, when the temperature of the liquid in the liquid-storage reservoir drops below a predetermined point, causes the valve to be automatically closed, thereby preventing further evaporation of the refrigerant until the temperature of the liquid reaches the predetermined point at which time the valve is opened to permit evaporation until the temperature has again dropped to the point desired. In this manner, I not only provide a source of liquid of constant or uniform temperature, but I materially increase the efficiency of the apparatus, and I am thereby able to reduce the period of generation, or, if desired, I may extend the time between the generating periods. This valve also has the advantage of accelerating the cooling action of the system when cold water is withdrawn from the storage reservoir.

The details in the construction of a preferred form of my invention, together with other objects attending its production, will be best understood from the following description of the accompanying drawing which is chosen for illustrative purposes only, and in which—

Fig. 1 is a sectional elevation showing a preferred form of my invention;

Fig. 2 is an enlarged sectional elevation with parts broken away illustrating details in the construction of the condensate container and its associated thermostatic valve;

Fig. 3 is a fragmentary elevational view taken in the general direction of the arrow 3 in Fig. 2.

More particularly describing the invention as herein illustrated, reference numeral 11 indicates, what I may term, a box having insulated walls 12, an insulated bottom 13, an insulated door 14, and an insulated top member 15.

Mounted on the top of the box 11, I provide a liquid-receiving reservoir 17, such reservoir having an open mouth 18 in its top which is shown as supporting a bottle or demijohn 19 containing water or other desired liquid to be cooled. The liquid-receiving reservoir 17 communicates through a pipe or conduit 20 which extends downwardly through the top member 15 with, what I may term, a liquid-cooling and storage reservoir 21 situated in the compartment 22 of the box 11.

Reference numeral 24 indicates a generator absorber, the general construction of which is the same as that shown in my copending application, referred to above, in that it contains a solid or dry absorbent such as calcium chloride, indicated at 25, and a plurality of radial-expansion members 26. The generator absorber is heated by means of a heating element 27 controlled by a suitable time switch indicated at 28 to expel over predetermined intervals a fluid refrigerant which has been absorbed by the absorbent 25. The fluid refrigerant thus expelled passes from the generator absorber through a connection 30 to a condenser conduit 31, which is shown as being in the nature of a coil mounted in the receiving reservoir, and is, therefore, arranged in heat-exchanging relation with the liquid in such reservoir.

The refrigerant, in passing through the conduit 31, condenses, and the condensed refrigerant flows downwardly through a connection 32 to the upper end portion of an inclined condensate and vapor-receiving chamber 33. The lower end portion of this chamber 33 is provided with an outlet connection 34 which extends downwardly into a drum 35 below the normal liquid level therein, such drum being associated with a circulation conduit 37 which extends into the compartment 22 and is shown as comprising a coil which surrounds the liquid-cooling and storage reservoir 21.

The drum 35 and the conduit 37 constitute, what I may term, a condensate container. When the generating period has been terminated by the automatic opening of the time clock switch 28, the absorbent immediately starts to cool. Meanwhile, most of the latent heat of vaporization absorbed by the liquid in the reservoir 17, has been dissipated through the walls of such reservoir to the atmosphere. The cooling of the absorbent is attended by a reduction of pressure in the system, and the condensate in the condensate containers 35 and 37 starts to evaporate at the surface of the liquid in the drum, such evaporation being attended by a substantial reduction in temperature. This reduction in temperature sets up a circulation through the circulation conduit 37 which obviously reduces the temperature of the compartment and the liquid in the storage reservoir 21. It will be observed that the coils of the circulation conduit 37 are spaced away from the walls of the reservoir 21 so that all of the heat absorbed by the condensate will not come from the liquid in the reservoir.

The vapor, as it leaves the surface of the liquid in the drum 35, passes through a vapor outlet connection 40 which has an opening in the top of the drum, and such connection communicates through a valve 41 with a connection 42 leading into the upper end portion of the condensate and vapor-receiving chamber 33. From this chamber, the vapors pass upwardly through the heat exchanger-condenser conduit 31 to the absorber generator where they are re-absorbed by the absorbent therein. During the passage of vapors through the conduit 31 they absorb heat from the liquid in the reservoir 17.

As was previously pointed out, it is one object of this invention to provide means for controlling the temperature, and the valve 41 is one element in such temperature-controlling means. This valve is shown as having a stem 44 which extends downwardly through a packing gland 45 in the upper end of an enclosing tube 46.

The tube 46 projects downwardly through the top of the container 21 and is welded or otherwise sealed thereto as indicated at 47. The lower end portion of the tube 46 is mounted on a shell or housing 48 which is shown as being threaded to a collar 49 on the bottom 21' of the reservoir 21. The lower end of the stem 44 is secured to a thermostat 50 shown as being of the bellows type, and the lower end of the bellows is secured to a threaded stem 51 which projects through the bottom 21' of the reservoir. The projecting end of the stem 51 carries a nut 52 which may be adjusted through the medium of a lever 53 extending through a slot 54 in a graduated plate 55 to obtain the desired temperature regulation.

It will be apparent that various other types of thermostatic controls may be employed to actuate the valve 41, the method of operation being to close the valve when the temperature has been lowered to a predetermined point, such closure preventing further evaporation of the refrigerant in the condensate container.

It is to be understood that, while I have herein described and illustrated one preferred form of my invention, the invention is not limited to the precise construction described above, but includes within its scope whatever changes fairly come within the spirit of the appended claims.

I claim as my invention:

1. The combination of: a box having a cooling compartment therein; a liquid-receiving reservoir mounted above said cooling compartment; a cold-liquid storage reservoir mounted in said compartment; means for delivering liquid from said receiving reservoir to said storage reservoir; an outlet connection in said storage reservoir; an absorber generator containing a dry absorbent and a fluid refrigerant; means for periodically heating said absorbent to expel said refrigerant; conduit means communicating with said absorber generator and arranged in heat-transferring relation with the liquid in said receiving chamber; and a condensate container communicating with said last mentioned conduit, said condensate container having a part thereof exposed in said compartment.

2. The combination of: a box having a cooling compartment therein; a liquid-receiving reservoir mounted above said cooling compartment; a cold liquid storage reservoir mounted in said compartment; means for delivering liquid from said receiving reservoir to said storage reservoir; an outlet connection in said storage reservoir; an absorber generator containing a dry absorbent and a fluid refrigerant; means for periodically heating said absorbent to expel said refrigerant; conduit means communicating with said absorber generator and arranged in heat-transferring relation with the liquid in said receiving chamber; and a condensate container communicating with said last mentioned conduit, said condensate container comprising an insulated reservoir mounted in the top of said box between said compartment and said liquid-receiving reservoir, and a circulation conduit communicating with said last mentioned reservoir and extending into said compartment.

3. The combination of: a box having a cooling compartment therein; a liquid-receiving reservoir mounted above said cooling compartment; a cold-liquid storage reservoir mounted in said compartment; means for delivering liquid from said receiving reservoir to said storage reservoir; an outlet connection in said storage reservoir; an absorber generator containing a dry absorbent and a fluid refrigerant; means for periodically heating said absorbent to expel said refrigerant; conduit means communicating with said absorber generator and arranged in heat-transferring relation with the liquid in said receiving chamber; and a condensate container communicating with said last mentioned conduit, said condensate container comprising an insulated reservoir mounted in the top of said box between said compartment and said liquid-receiving reservoir, and a circulation coil communicating with said last mentioned reservoir and surrounding said liquid storage reservoir in said compartment.

4. The combination of: a box having a cooling compartment therein; a liquid-receiving reservoir mounted on said box; a liquid-storage reservoir mounted in said cooling compartment and communicating with said receiving reservoir; a liquid outlet connection in said storage reservoir; a heat exchanger-condenser conduit mounted in heat-transferring relation with said receiving reservoir; means for delivering a gaseous refrigerant into said condenser conduit; a condensate container communicating with said condenser conduit, said condensate container having a circulation conduit which extends into said cooling compartment.

5. The combination of: a box having a cooling compartment therein; a liquid-receiving reservoir mounted on said box; a liquid-storage reservoir mounted in said cooling compartment and communicating with said receiving reservoir; a liquid outlet connection in said storage reservoir; a heat exchanger-condenser conduit mounted in heat-transferring relation with said receiving reservoir; means for delivering a gaseous refrigerant into said condenser conduit; a condensate container communicating with said condenser conduit, said condensate container having a circulation coil which extends into said cooling compartment and surrounds the liquid-storage reservoir therein.

6. The combination of: a box having a cooling compartment therein; a liquid-receiving reservoir mounted on said box; a liquid-storage reservoir mounted in said cooling compartment and communicating with said receiving reservoir; a liquid outlet connection in said storage reservoir; a heat exchanger-condenser conduit mounted in heat-transferring relation with said receiving reservoir; an absorber generator for delivering a gaseous refrigerant into said condenser conduit; a condensate container communicating with said condenser conduit, said condensate container having a circulation conduit which extends into said cooling compartment.

7. The combination of: a box having a cooling compartment therein; a liquid-receiving reservoir mounted on said box; a liquid storage reservoir mounted in said cooling compartment and communicating with said receiving reservoir; a liquid-outlet connection in said storage reservoir; a heat exchanger-condenser conduit mounted in heat-transferring relation with said receiving reservoir; a condensate container having a portion thereof exposed in heat-transferring relation with the interior of said compartment; a condensate-inlet pipe leading from said condenser conduit to a point below the normal liquid level in said condensate container; a refrigerant-outlet connection leading from the top of said condensate container to said condenser conduit; a valve in said outlet connection; and thermostat means in said compartment for actuating said valve.

8. The combination of: a box having a cooling compartment therein; a liquid-receiving reservoir mounted on said box; a liquid-storage reservoir mounted in said cooling compartment and communicating with said receiving reservoir; a liquid outlet connection in said storage reservoir; a heat exchanger-condenser conduit mounted in heat-transfer relation with said receiving reservoir; a condensate container having a portion thereof exposed in heat-transferring relation with the interior of said compartment; a condensate inlet pipe leading from said condenser conduit to a point below the normal liquid level in said condensate container; a refrigerant-outlet connection leading from the top of said condensate container to said condenser conduit; a valve in said outlet connection and thermostat means in said liquid-storage reservoir for actuating said valve.

9. The combination of: a box having a cooling compartment therein; a liquid-receiving reservoir mounted on said box; a liquid-storage reservoir mounted in said cooling compartment and communicating with said receiving reservoir; a liquid-outlet connection in said storage reservoir; a heat exchanger-condenser conduit mounted in heat-transfer relation with said receiving reservoir; a condensate container having a portion thereof exposed in heat-transferring relation with the interior of said compartment; a condensate-inlet pipe leading from said condenser conduit to a point below the normal liquid level in said condensate container; a refrigerant-outlet connection leading from the top of said condensate container to said condenser conduit; a valve in said outlet connection; thermostat means in said liquid-storage reservoir for actuating said valve; and means for adjusting said thermostat to govern the temperature at which said valve is actuated.

10. A liquid-cooling system of the class described embodying: a liquid-receiving reservoir and a cold liquid-storage reservoir communicating therewith; an outlet connection in said storage reservoir; a generator absorber containing an absorbent and a fluid refrigerant; means for periodically heating said absorbent to expel said refrigerant; conduit means for receiving the fluid refrigerant from said absorber generator, said conduit means being arranged in heat-transferring relation with a liquid in said receiving reservoir; a condensate and vapor-receiving chamber communicating with said last mentioned conduit; a condensate container having a portion thereof arranged in heat-transferring relation with said storage reservoir; means for delivering condensed refrigerant from said condensate and vapor-receiving chamber to a point below the normal liquid level in said condensate container; a conduit connection for delivering vaporized refrigerant from the top of said condensate container to said condensate and vapor-receiving chamber; a valve in said last mentioned connection; and thermostat means in said storage reservoir for actuating said valve.

MAX ALEX.